United States Patent Office 3,772,258
Patented Nov. 13, 1973

3,772,258
PROCESS FOR THE POLYMERIZATION OF
ACRYLIC ACID ESTERS
Donald R. Lachowicz, Fishkill, N.Y., assignor to
Texaco Inc., New York, N.Y.
No Drawing. Filed Oct. 13, 1971, Ser. No. 188,438
Int. Cl. C08f 3/64, 3/66, 15/26
U.S. Cl. 260—86.1 E    13 Claims

ABSTRACT OF THE DISCLOSURE

Vinyl monomers of the type exemplified by the alkyl methacrylates are first contacted with dinitrogen tetroxide and the thus-treated alkyl methacrylate heated to a temperature of from about 50 to about 140° C. to effect polymerization of the methacrylate.

FIELD OF THE INVENTION

This invention relates to a process for the polymerization of vinyl-type compounds, such as acrylic acid esters. More particularly, this invention relates to a process in which acrylic acid esters which have been pretreated with dinitrogen tetroxide are polymerized by heating to a temperature of about 50 to about 140° C.

DESCRIPTION OF THE PRIOR ART

Numerous catalysts are known in the art which are useful for polymerizing compounds having a vinyl linkage including peroxides, persulgates, azo initiators, etc. Likewise, a wide variety of polymerization systems have been employed in preparing vinyl polymers such as bulk, solution, suspension and emulsion types.

All of the above-mentioned polymerization processes suffer from a variety of disadvantages. For example, the compounds which contain directly-linked oxygen atoms, such as hydrogen peroxide, benzoyl peroxide, lauroyl peroxide, potassium persulfate and other widely employed catalysts of this type, may alter the color of dyestuffs added during polymerization, they may oxidize the polymer with resulting discoloration and crosslinking effects and the polymers obtained may contain oxidizing residues which can preclude the use of such polymers in some applications. Further, fragments derived from the art-employed catalysts may promote degradation of the finished polymer product.

One of the major objects of this invention is to provide a process for the polymerization of acrylic acid esters employing dinitrogen tetroxide as an initiator.

Another object of this invention is to provide a process for the polymerization of acrylic acid esters which utilizes an initiator which can be conveniently added to the reaction mixture in gaseous form.

Another object of this invention is to provide a convenient method for polymerizing acrylic acid esters which does not require a solvent.

SUMMARY OF THE INVENTION

In its broadest aspect, this invention relates to a process for polymerizing acrylic acid esters, including mixtures thereof, by contacting the ester with dinitrogen tetroxide and then heating the thus-treated ester at a temperature of about 50 to about 140° C.

The products of this invention can contain one or more of the various conventional additives such as dyes, pigments, lubricants, plasticizers and modifying agents. The process of this invention may be conducted as a batch or as a continuous process, as desired.

DETAILED DESCRIPTION OF THE INVENTION

Acrylic acid esters which may be polymerized by the method of this invention include compounds of the formula:

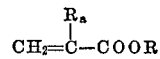

wherein R is alkyl of from 1 to about 30 carbon atoms, as exemplified by methyl, ethyl, propyl, butyl, pentyl, hexyl, heptyl, nonyl, decyl, lauryl, myristyl, cetyl, stearyl, etc. and isomers thereof, and $R_a$ is selected from the group consisting of hydrogen and alkyl of from 1 to 3 inclusive carbon atoms as exemplified by methyl, ethyl, propyl and isopropyl. Mixtures of the acrylic acid esters may be employed, if desired.

The higher alkyl acrylates can be conveniently prepared from the corresponding methyl acrylate by alcoholysis. Usually, the reaction is conducted with an excess of the alcohol and a small amount of a mineral acid, such as sulfuric acid, as described in Textbook of Polymer Science, Billmeyer, F.W., Interscience Publishers, New York, 1966, p. 403.

A wide range of temperatures can be utilized in conducting the polymerization process of this invention although usually the first stage of the process in which the acrylic acid ester is contacted with dinitrogen tetroxide is carried out at tempeartures ranging from about −20 to 30° C., and, preferably, at about −5 to about 10° C., while in the second stage the thus-treated ester is heated at a temperature of about 50 to about 140° C., and, preferably, at about 75 to about 120° C.

While the initiator in this process is referred to as dinitrogen tetroxide, the initiator is actually an equilibrium mixture of dinitrogen tetroxide and nitrogen dioxide with the equilibrium being driven essentially to 100% dinitrogen tetroxide at 0° C. and essentailly 100% nitrogen dioxide at 140° C. The term "dinitrogen tetroxide" as used herein means the equilibrium mixture as well as the pure $N_2O_4$ compound.

Although it is highly convenient to add the dinitrogen tetroxide initiator to the reaction mixture in gaseous form, liquid dinitrogen tetroxide may be added, if desired. Gaseous dinitrogen tetroxide may be conveniently added by passing a stream of an inert gas such as nitrogen, argon, helium, etc. through liquid dinitrogen tetroxide and then passing the gaseous mixture into the reaction mixture.

Although only a catalytic amount of the initiator is required, generally in practicing this polymerization process from $1 \times 10^{-5}$ to about $300 \times 10^{-5}$ mole of dinitrogen tetroxide per mole of the acrylic acid ester charged to the reactor is used in the first stage and, preferably, the amount is between about $5 \times 10^{-5}$ and about $250 \times 10^{-5}$ mole of dinitrogen tetroxide per mole of the acrylic acid ester.

Although the role of the dinitrogen tetroxide initiator in promoting the polymerization of the acrylic acid esters is not completely understood it is believed that the dinitrogen tetroxide reacts with a small amount of the charged ester to form a nitrated intermediate product which promotes the polymerization reaction in the second or heating stage.

The time required to effect a suitable degree of conversion of the monomer to the polymer will vary widely depending on the particular monomer being polymerized, the quantity of initiator added as well as the other operating conditions. Generally, from about 0.5 to about 6 hours will suffice to give a satisfactory yield of the acrylate polymer.

Recovery of the polymer from the monomer remaining at the conclusion of the polymerization process can be accomplished in a variety of ways well known in the art. For example, the polymer can be precipitated by pouring the reaction mixture into a monohydric alcohol, such as methanol, ethanol, etc. After the mixture has been allowed to stand for a number of hours, e.g., from 1 to 24 or more, the methanol is removed by decantation or by any other suitable means following which the polymer is rinsed with an additional quantity of the monohydric alcohol and dried in a vacuum oven at about room temperature.

Since the polymerization of acrylates is drastically inhibited by oxygen, the process of this invention is preferably carried out in an inert atmosphere, which can be, for example, nitrogen, argon, etc., although for reasons of economy, nitrogen is the usual gas employed.

Other materials such as carbon tetrachloride, dimethylformamide, as well as plasticizers, such as dibutyl phthalate, ultra-violet absorbers, pigments and dyes, chain transfer agents including alkyl mercaptans, such as dodecyl mercaptan, aromatic disulfides, such as dixylyl disulfide, and other halogen compounds, to modify the polymerization reaction or the properties of the final products may be added to the polymerization mixtures, if desired. If utilized, generally from about 0.01 to 5.0 volume percent or more of the modifier based on the volume of the acrylic acid ester is incorporated in the charge.

The polymers formed by the method of this invention possess high molecular weights, i.e., from about 50,000 to about $5 \times 10^{-6}$ or more, and exhibit highly satisfactory physical properties making them useful for the wide variety of applications for which such acrylate polymers are normally employed.

The following examples which illustrate various embodiments of this invention are to be considered not limitative.

Example I

Into a 3-necked round bottom flask equipped with thermometer, water condenser, and gas inlet tube was placed 50 ml. of distilled methyl methacrylate. The latter was stirred by a magnetic stirring bar, purged with pre-purified nitrogen for ½ hour and cooled to 0–5° C. with an ice bath. Using a hypodermic syringe, 5 ml. of gaseous $N_2O_4$ (320 p.p.m. based on the weight of the monomer, measured at room temperature and atmospheric pressure) was added to the cold methyl methacrylate. After stirring the solution for 15 minutes, it was heated at about 75° C. for 3 hours while maintaining a slow nitrogen stream to provide a nitrogen blanket. After the heating period, 25 ml. of benzene was added to the reaction mixture which was allowed to cool to near room temperature. The reaction mixture was stirred into 750 ml. of methanol resulting in the precipitation of the poly-(methyl methacrylate) which was washed with methanol and dried under full pump vacuum at room temperature. The weight of the dry polymer recovered was 6.1 g. The amount of product obtained in a simultaneous blank run (carried out under identical conditions except in the absence of $N_2O_4$) was 0.2 g.

Examples II–IV

Three additional examples were carried out in the same manner as Example I in which the time allotted for reaction of the methacrylate ester with $N_2O_4$ prior to the heating step varied from 5 to 30 minutes. The volume of methanol used to precipitate the polymer varied from 500 to 750 ml. Pertinent details relating to these examples are set forth in Table 1 which follows:

TABLE 1

Polymerization of methacrylate esters by prior treatment with $N_2O_4$

| Example | Methacrylate ester (ml.) | $N_2O_4$ (p.p.m.) | Polymer yield (g.) | Yield from blank run (g.) |
|---|---|---|---|---|
| II | Methyl (50) | 64 | 2.4 | 0.2 |
| III | Methyl (10) / Butyl (40) [b] | [a] 320 | [c] 5.9 | Negligible |
| IV | Lauryl (50) [b] | 640 | 8.2 | 0.4 |

[a] $N_2O_4$ added to methyl methacrylate; butyl methacrylate added 5 minutes later.
[b] Purified by washing with aqueous alkali.
[c] Copolymer.

What is claimed is:

1. A process for polymerizing a monomer of the formula:

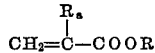

wherein R is alkyl of from 1 to 30 carbon atoms and $R_a$ is selected from the group consisting of hydrogen and alkyl of from 1 to 3 inclusive carbon atoms, which comprises:

(a) contacting the monomer with dinitrogen tetroxide initiator at a temperature of about −20 to about +30° C. to form a nitrated intermediate product, (b) heating the thus-formed intermediate product to effect polymerization thereof, and (c) recovering the polymer formed from the reaction mixture, and wherein in step (a) the dinitrogen tetroxide is present in an amount of from about $1 \times 10^{-5}$ to about $300 \times 10^{-5}$ mole per mole of the monomer.

2. The process of claim 1 wherein step (b) is conducted at a temperature ranging from about 75 to about 120° C.

3. The process of claim 1 wherein the polymerization is conducted at a pressure of from about atmospheric to about 100 p.s.i.g.

4. The process of claim 1 wherein the said monomer is methyl methacrylate.

5. The process of claim 1 wherein the said monomer is butyl methacrylate.

6. The process of claim 1 wherein the said monomer is lauryl methacrylate.

7. The process of claim 1 wherein the said monomer is a mixture of alkyl methacrylates.

8. The method of claim 1 wherein the said monomer is is a mixture methyl and butyl methacrylate.

9. The process of claim 1 wherein the polymerization is conducted in the presence of a modifier selected from the group consisting of carbon tetrachloride, dimethylformamide, dodecyl mercaptan and dixylyl disulfide.

10. The process of claim 1 wherein the said monomer is contacted with the initiator under an atmosphere of an inert gas.

11. The process of claim 1 wherein the said monomer is methyl methacrylate, and wherein step (b) is conducted at a temperature of from about 75 to about 120° C.

12. The process of claim 1 wherein the said monomer is butyl methacrylate, and wherein step (b) is conducted at a temperature of about 75 to about 120° C.

13. The process of claim 1 wherein the said monomer is lauryl methacrylate, and wherein step (b) is conducted at a temperature of about 75 to about 120° C.

References Cited

Podgoronova et al.: Chem. ABS. 69 (1968), p. 32475Z.
Miller, Chem. ABS. 71 (1969), p. 90701X.

HARRY WONG, JR., Primary Examiner

U.S. Cl. X.R.

260—31.8 R, 31.8 N, 89.5 A, 89.5 N, DIG. 43